March 17, 1959 — F. J. BASHARA — 2,877,852
WELL FILTERS
Filed Sept. 20, 1954 — 2 Sheets-Sheet 1
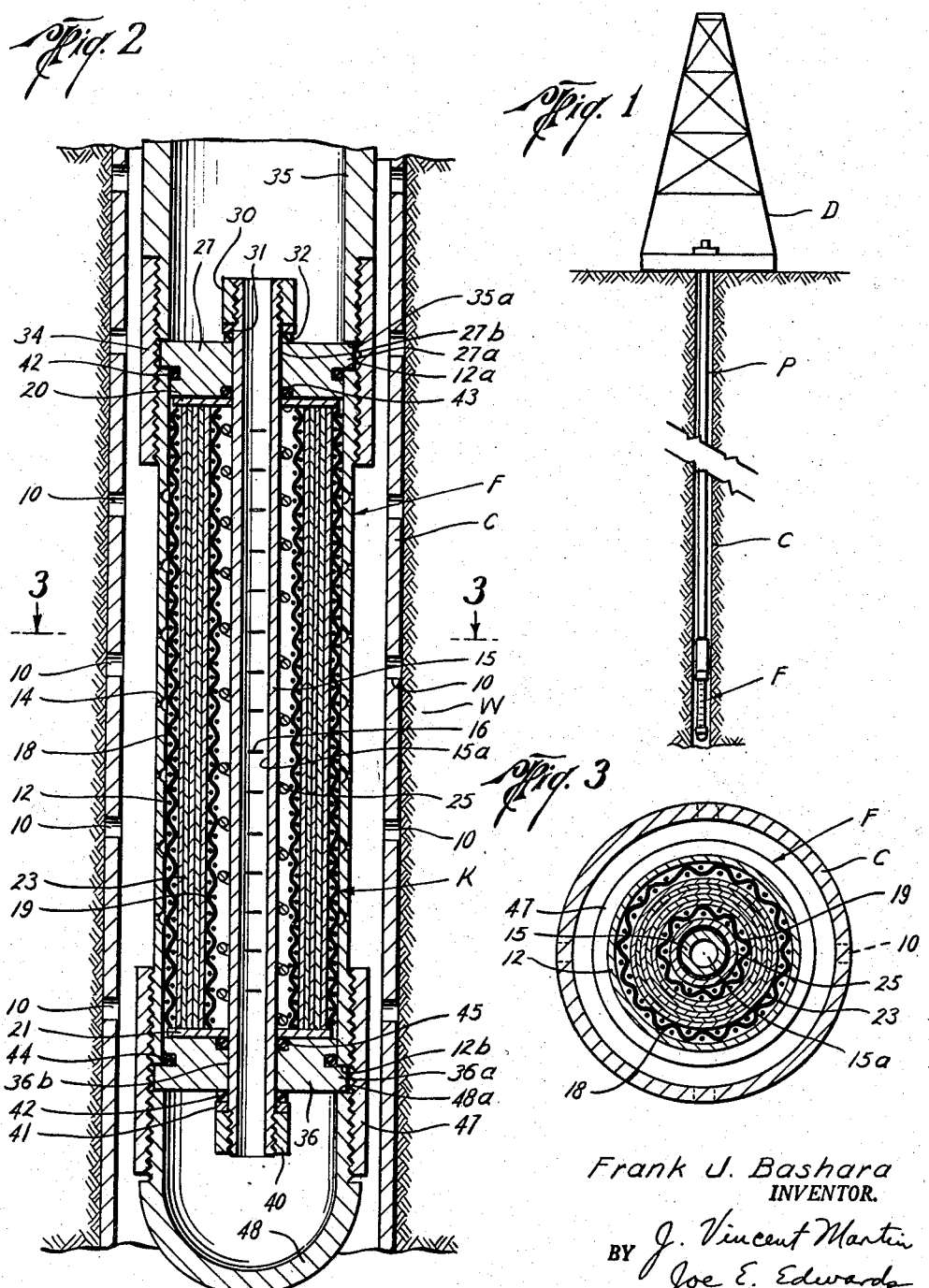
Frank J. Bashara
INVENTOR.
BY J. Vincent Martin
Joe E. Edwards
B. R. Pravel
ATTORNEY March 17, 1959   F. J. BASHARA   2,877,852
WELL FILTERS
Filed Sept. 20, 1954   2 Sheets-Sheet 2
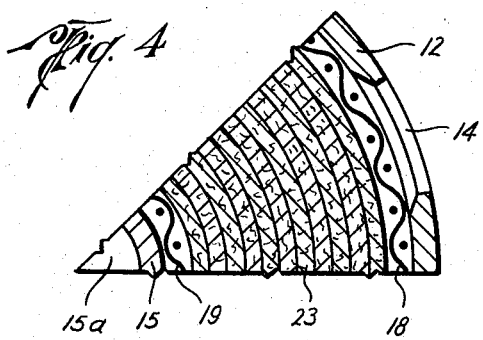
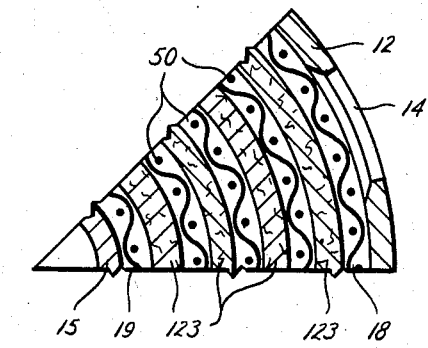
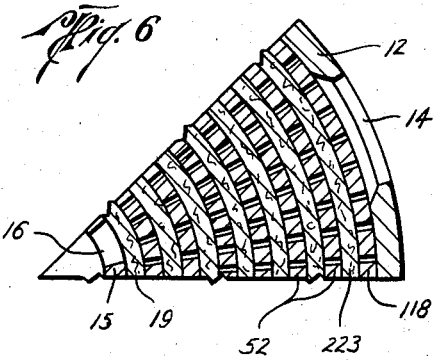
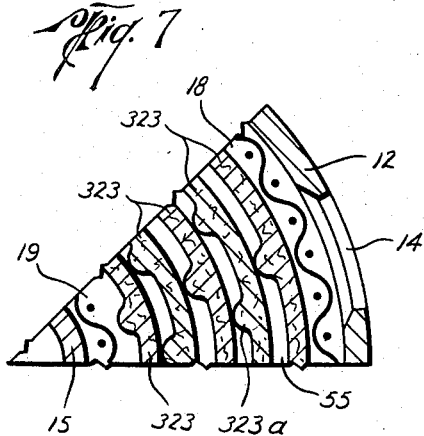
Frank J. Bashara
INVENTOR.
BY J. Vincent Martin
Joe E. Edwards
B. R. Pravel
ATTORNEY

United States Patent Office 2,877,852
Patented Mar. 17, 1959

2,877,852

WELL FILTERS

Frank J. Bashara, Dallas, Tex.

Application September 20, 1954, Serial No. 457,208

7 Claims. (Cl. 166—236)

This invention relates to new and useful improvements in well filters.

For a number of years it has been common practice to employ well filters or strainer screen assemblies in which the filtering medium is gravel, sand or other like granular material of particular predetermined sizes. Such strainers or strainer screens are still used today and are generally called gravel-packed filters, two examples of which are illustrated in the U. S. Patents 1,291,288 and 1,588,920.

Gravel-packed filters, i. e. filters having a granular material such as gravel and sand as the filtering agent therein, have been commonly accepted for use in oil wells or other types of wells despite the fact that gravel-packed filters have certain known undesirable characteristics, one of the most obvious of which is the escape of smaller grains of sand through the filter either from the "gravel" itself or from the well fluid being filtered, which condition is evident from the relatively short life of the piston cups and other parts of the well pumps used in conjunction with such filters.

It is an object of this invention to provide an improved well filter which is adapted to be lowered into a well casing or pipe on a tubing or pipe string, the filter being constructed in such a manner that the passage of sand and other abrasive granular type materials into the tubing from the casing is prevented or reduced to increase the life of the piston cups and other parts of the well pumps used in conjunction with the well filter, while at the same time permitting equal or increased fluid flow from the casing to the tubing as compared to prior known filters.

An important object of this invention is to provide a new and improved well filter adapted to be supported on a well tubing or pipe string within a well bore, wherein the filter material of the filter is glass fabric cloth which is disposed in one or more layers, whereby fluid flowing from the well into the tubing passes through the filter material to filter out sand and other granular substances.

Another object of this invention is to provide a new and improved well filter, wherein woven fabric, preferably woven glass cloth, is confined under tension between inner and outer cylinders having openings therethrough, such openings being adjusted to obtain a maximum rate of fluid flow through the filter material while maintaining a sufficient pressure drop across the material so as to have proper filtering action.

Another object of this invention is to provide a new and improved well filter which includes a filter cartridge having the filter material therein whereby the cartridge can be removed from the filter housing to replace same, such filter cartridge having a resilient member or spring associated therewith for assisting in maintaining the filter material under tension to thereby prevent matting of the material.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is an elevation illustrating schematically the well filter of this invention as used in connection with a well pump in an oil well or the like.

Figure 2 is a sectional view illustrating the improved filter of this invention.

Figure 3 is a horizontal sectional view taken on line 3—3 of Figure 2.

Figure 4 is an enlarged horizontal sectional view illustrating a sector of the view shown in Figure 3.

Figure 5 is a view similar to Figure 4, but illustrating a modification of that construction.

Figure 6 is also a view similar to Figure 4 but illustrating still another modification thereof.

Figure 7 is also a modification of Figure 4 but illustrates a still different modification thereof.

In the drawing, the letter F designates generally the well filter of this invention which is adapted to be lowered into a well bore or casing C on a tubing or pipe string P which is suspended in the usual well derrick D. The filter F of this invention is particularly suitable for use wherein a well pump (not shown) is located in the tubing or pipe string P above the filter F, because as fluid is pumped from the well formation W through the gun perforations 10 in the casing C, this filter F prevents substantially all sand and and other harmful abrasives from entering the tubing or pipe string P, whereby the harmful effects which result from sand and other abrasives on piston suction cups, barrels and seats and steel rings of the usual pumps used in wells is prevented.

The well filter F (Figures 2–4) includes an outer perforated cylinder or housing 12 having slots 14, or other equivalent openings formed therethrough. Within the outer cylinder or housing 12, there is positioned substantially concentrically an inner perforated pipe or tube 15, which also has slots 16 or other equivalent openings therethrough. The inner pipe or tube 15, is suitably mounted, as will be explained so that an annular space is provided between the inner pipe 15 and the outer housing 12. Within that annular space between the inner tube 15 and the outer housing 12, the filter cartridge K is disposed and, in the form shown in Figures 2–4, such cartridge K includes an outer cylindrical screen 18 and an inner cylindrical screen 19, the ends of which are connected together by annular plates or disks 20 and 21. Such annular plates or disks 20 and 21, are welded, brazed or otherwise joined to the ends of the inner cylinder screen 18 and the outer cylinder screen 19. Between the inner and outer screens 18 and 19, the filter material layers 23 are disposed. Such material is a textile cloth, preferably a glass fabric cloth, which is woven so as to provide openings therethrough of a predetermined size. The size of the openings in the cloth will in the usual cases vary from about .012 inches to about .018 inches, although it will be understood that the invention is not confined to any particular size of the openings in the glass cloth fabric layers forming the filter material 23.

The fabric layers 23 are preferably wrapped around the inner screen 19 so that a plurality of the layers are disposed between the inner screen 19 and the outer screen 18. The screens 18 and 19 are so positioned that they maintain the cloth filter material 23 relatively taut so that the openings in the cloth are not closed by reason of wrinkles or compression or other distortion of the material. The cloth layers 23 are actually held under longitudinal and lateral tension between the screen cylinders 18 and 19 to prevent the openings of the filter material layers 23 from becoming distorted by reason of the matting of the layers 23 or otherwise.

The arrangement of the cloth layers and screens to maintain the cloth under tension may be accomplished in any of several different ways. For instance, concentric layers of cloth may be telescoped and placed under circumferential tension by expanding the inner screens circumferentially and then fastening the lap joint of the inner screen. Thereafter the outer screen can be placed about the cloth layers and fastened to slightly compress the cloth layers. The end plates can then be secured to the screens and as they will be urged away from each other by spring 25 longitudinal tension will be applied to the cloth layers due to their frictional contact with the screens and with each other. The detailed arrangement of the end plates and screen 25 will be discussed hereinafter.

As a further alternative the layers of cloth may be provided by wrapping them helically about the inner screen, applying tension to the cloth while wrapping. Then the outer screen may be positioned about the cloth and have a slight pressure contact therewith. Again the spring will apply longitudinal tension.

As a still further alternative the cloth may be cut on the bias, wrapped helically about the inner screen and confined by the outer screen. The longitudinal force applied to the cloth by elongation of the screens by spring 25 will apply a longitudinal and circumferential tension to the cloth due to the contact between the screens and cloth and transmission of some of the longitudinal forces circumferentially by reason of the bias cut cloth.

It is particularly advantageous to employ glass fabric cloth as the filter material 23 since it is able to withstand acids which may be present in the formation from previous acidizing operations or otherwise and it is also able to withstand the temperatures on the order of 1200° Fahrenheit encountered at the lower depths in oil wells and the like. Furthermore, glass cloth has the unexpected property of not matting under the high well pressures encountered, which property prevents a closure of the openings in the glass cloth. Also, such property of the glass cloth or fabric permits the placing of layers 23 of glass cloth under the longitudinal and lateral tension by confining same between the inner and outer screens 18 and 19 without closing or partially closing the openings formed in the woven glass cloth.

In addition to the tension provided by the confining of the cloth layer 23 between the inner and outer cylinder screens 18 and 19, the filter cartridge K is also urged longitudinally to assist in maintaining same under longitudinal tension condition by means of a resilient member or coil spring 25, which is disposed within the inner screen 19 and which acts against the annular plates 20 and 21 to constantly urge them away from each other. The spring 25 fits around the inner tube 15 but is not attached thereto as that it can exert its full spring action on the end plates 20 and 21.

For holding the parts of the filter in position, an annular retainer 27 is disposed at the upper end of the housing 12 and is formed with an outwardly extending radial flange 27a which rests upon the upper end 12a of the outer housing 12. The retainer 27 has a central opening 27b through which the upper portion of the inner perforated pipe 15 extends. The upper end of the inner perforated pipe 15 has a lock nut 30 threaded thereto which acts against a washer 31 and an O-ring 32 made of rubber or a rubber-like material to form a seal at the upper end of the inner pipe or tube 15. The annular retainer 27 is fixed against movement with respect to the outer cylinder 12 by reason of a coupling 34 which is threaded to the housing 12 and is also threaded to the lower end of a section of pipe 35 which, in the usual case, is the working barrel of the well pump (not shown). In this manner, the lower end 35a of the pipe 35 confines the flange 27a of the retainer 27 against upward movement.

The lower end of the filter is constructed in substantially the same way as the upper end and includes an annular retainer 36 which has a radial flange 36a abutting the lower edge 12b of the outer housing 12. The lower portion of the inner pipe or tube 15 extends through a central opening 36b in the retainer 36 and a lock nut 40 is threaded to the lower end of the pipe 15 to confine a washer 41 and an O-ring 42 against the retainer 36 to thereby provide a fluid seal. Also, fluid seals are provided by O-rings 42 and 43 at the upper retainer 27 and by similar fluid seals 44 and 45 at the lower retainer 36. The lower retainer 36 is held in a fixed position with respect to the housing by reason of a coupling 47 which is threaded to the housing 12 and to a nose plug 48 therebelow. Such plug 48 has an upper edge 48a which abuts the annular radial flange 36a of the retainer 36 to thereby confine the retainer 36 against longitudinal movement.

Although the pressure conditions in a well will largely determine the size of the openings 14 in the outer cylinder 12 and the openings 16 in the inner tube 15, as a general proposition, such openings are adjusted so that both are at least as large as the openings in the filter cloth 23 so as to cause the filter cloth 23 to be the main filtering agent. Such openings 14 and 16 are made sufficiently large so as not to restrict fluid flow through the cloth 23 but usually the openings 16 are made slightly smaller than the openings 14 so as to create a pressure differential across the filter cloth 23 which assists in the filtering action of the cloth. For purposes of illustration, a well filter F might have openings of .014 inch in the cloth 23, openings 14 of .020 inch in the outer cylinder 12, and openings 16 of .018 inch in the inner tube 15. Of course, the invention is not limited to such sizes. Also, it will be evident that the openings in the screens 18 and 19 are at least as large as, and usually are larger than, the openings in the cloth 23.

In the operation or use of the filter shown in Figures 2–4, the filter F is lowered into the well to a point adjacent the gun perforations 10 and the casing C in the usual manner for the lowering of well filters. With the filter in position within the well casing or bore C (Figures 1 and 2), the fluid from the well formation W flows into the casing through the perforations 10 and then is caused to flow through the filter cloth 23 to the bore 15a of the inner pipe or tube 15 whereby the fluid is conducted upwardly to the section of pipe 35 in the tubing string P. The fluid seals provided by the various O-rings at the ends of the filter prevent the flow of the fluid from the formation except through the filter cloth layers 23, whereby all of the fluid which reaches the bore 15a of the inner tube 15 is forced to pass through the filter cloth 23 and the sand and other abrasive particles are thereby prevented from passing through to the tubing string. Although the lower end of the inner pipe 15 is shown open in the drawing, it will be appreciated that such lower end could be plugged or closed since the fluid flow is upwardly into the tubing or pipe string P.

When it is desirable to replace the filter material, the entire filter cartridge K can readily be removed. Such can be accomplished in numerous ways, the preferred way being to first remove the bull plug 48 and then the lock nut 40, whereby the retainer 36 can be lowered so that the entire filter cartridge K can be removed from the annular space between the perforated cylinder members 12 and 15. The re-assembly is, of course, accomplished in reverse manner and such operation takes only a very short time which is, of course, very important in well operations.

In Figure 5, a modification of the internal construction of the filter F is illustrated. In that modification, the outer cylinder screen 18 and the inner cylinder screen 19 are utilized as in the form shown in Figures 2–4 and such screens are positioned between the outer cylinder 12 and the inner cylinder 15. However, instead of providing for the filtering action by a plurality of adjacent filter cloth layers 23 as in Figures 2–4, the Figure 5 modification has glass cloth fabric layers 123 which are spaced alternately with respect to screen cylinders 50. This modification is used in the same manner as that shown in Figures 2–4 and the inner screens 50 assist the screens 18 and 19 in maintaining the fabric layers 123 in tension longitudinally and laterally.

In the Figure 6 modification of the filter F, an outer perforated cylindrical member 118 confines alternate layers of woven fabric 223 and perforated metal 52 against the tube 15. In this form as in the other previously described forms, the fabric material 223 is preferably glass cloth fabric and the alternating perforated metal sheets or cylinders 52 serve to maintain the cloth layers 223 in a state of tension so as to maintain the openings therein to proper size.

In Figure 7, still another modification of the filter F of Figures 2–4 is illustrated. In this form the filter cartridge K includes the outer screen 18 and the inner screen 19 which are disposed in the same manner as in Figures 2–4 between the outer perforated metallic housing 12 and the inner tube 15. The fabric layers 323 are of a woven textile material which is preferably glass fabric and which is formed with a twill weave whereby longitudinal ribs 323a are formed in the woven cloth itself. Such ribs 323 provide for a separation of the layers of the cloth 323 so as to provide a space 55 therebetween which facilitates distribution of the fluid flow and provides for a circuitous path for the fluid to follow in the event that a portion of the filter material becomes clogged. This particular form shown in Figure 7 is particularly desirable in instances wherein the pressure of the fluid from the formation W is high, because under such high well pressure conditions the tendency of the cloth to mat and thereby to close the openings is greater, but such tendency is prevented by the ridges or ribs 323a even more so than with the ordinary glass fabric layers woven without such ridges as illustrated in Figures 2–4.

The foregoing disclosure and description of the invention is illustrative and explanatory thereof and various changes in the size, shape and materials, as well as in the details of the illustrated construction may be made, within the scope of the appended claims, without departing from the spirit of the invention.

What is claimed is:

1. A well filter adapted to be lowered into a well bore on a pipe string comprising, an outer perforated metal housing having connection with said pipe string, an inner perforated metal tube having an open upper end, means for supporting said tube within said housing to form an annular space between said tube and said housing, a removable filter cartridge within said annular space for filtering sand and the like from a well fluid flowing therethrough to the bore of said inner tube, said removable filter cartridge including an outer screen and an inner screen, a plurality of glass cloth fabric layers compressed between the screens, said screens holding the fabric under longitudinal and circumferential tension to prevent matting of the layers during use, and means for stretching the screens to apply longitudinal tension to the layers through their contact with each other and with the screens.

2. The filter set forth in claim 1, wherein said woven cloth layers are disposed in alternate arrangement with respect to cylindrical metallic members having openings therethrough, the metallic members serving to maintain the cloth layers in longitudinal and lateral tension to thereby prevent matting of the cloth layers.

3. The filter set forth in claim 1, wherein said cloth layers are alternately disposed with respect to cylindrical screens, the screens assisting in maintaining the cloth layers in longitudinal and lateral tension to prevent matting thereof.

4. The filter set forth in claim 1, wherein said woven cloth layer is a glass fabric having ridges woven therein to provide for spacing of adjacent layers of the glass fabric cloth to facilitate the non-matting action of the glass fabric.

5. A well filter adapted to be lowered into a well bore on a pipe string, comprising an outer perforated metal housing having connection with said pipe string, an inner perforated metal tube having an open upper end, means for supporting said tube within said housing to form an annular space between said tube and said housing, and a removable filter cartridge within said annular space for filtering sand and the like from a well fluid flowing therethrough to the bore of said inner tube, said removable filter cartridge including an outer screen and an inner screen, and a plurality of glass cloth fabric layers confined therebetween in contact with each other and with said outer and inner screens, the inherent resiliency of said screens applying a compressive force to said layers so as to maintain such cloth layers under longitudinal and lateral tension to assist in preventing the matting of said layers during use, annular end plates connected to the inner and outer screens, each of said end plates projecting inwardly from said inner screen, and resilient means surrounding said inner tube and having its ends in engagement with the portion of the end plates extending inside of the inner screen to thereby urge the inner and outer screens longitudinally and place same under tension for assisting the outer and inner screens in maintaining the cloth filter layers under tension.

6. A replacement cartridge for a well filter comprising, an inner and outer screen, a plurality of glass cloth fabric layers compressed between the screens, said screens holding the fabric under longitudinal and circumferential tension to prevent matting of the layers during use, and means for stretching the screens to apply longitudinal tension to the layers through their contact with each other and with the screens.

7. A filter cartridge for use in a well filter comprising, inner and outer annular screens, a plurality of glass cloth fabric layers compressed between the screens, said screens holding the fabric under longitudinal and circumferential tension to prevent matting of the layers during use, and resilient means connected between the ends of said screens, said resilient means being under compression and holding the screens under tension to apply longitudinal tension to the layers through their contact with each other and with the screens.

References Cited in the file of this patent

UNITED STATES PATENTS

| | | |
|---|---|---|
| 71,144 | Dean | Nov. 19, 1867 |
| 1,229,437 | Foster | June 12, 1917 |
| 1,291,288 | Van Ness | Jan. 14, 1919 |
| 1,356,187 | Burgard | Oct. 19, 1920 |
| 1,898,027 | Winslow | Feb. 21, 1933 |
| 2,321,985 | Briggs | June 15, 1943 |
| 2,448,157 | Schneider | Aug. 31, 1948 |
| 2,530,223 | Breaux | Nov. 14, 1950 |
| 2,703,650 | Supinger | Mar. 8, 1955 |